(12) United States Patent
Glass

(10) Patent No.: US 9,946,604 B1
(45) Date of Patent: Apr. 17, 2018

(54) OPTIMIZED REMOTE CLONING

(71) Applicant: Tintri Inc., Mountain View, CA (US)

(72) Inventor: Gideon W. Glass, Los Altos, CA (US)

(73) Assignee: Tintri Inc., Mountain View, CA (US)

( * ) Notice: Subject to any disclaimer, the term of this patent is extended or adjusted under 35 U.S.C. 154(b) by 58 days.

(21) Appl. No.: 15/013,859

(22) Filed: Feb. 2, 2016

Related U.S. Application Data

(60) Provisional application No. 62/111,833, filed on Feb. 4, 2015.

(51) Int. Cl.
*G06F 3/06* (2006.01)
*G06F 11/14* (2006.01)

(52) U.S. Cl.
CPC .......... *G06F 11/1451* (2013.01); *G06F 3/065* (2013.01); *G06F 3/067* (2013.01); *G06F 3/0617* (2013.01); *G06F 11/1435* (2013.01); *G06F 11/1466* (2013.01); *G06F 2201/84* (2013.01)

(58) Field of Classification Search
CPC .............. G06F 3/065; G06F 11/1446–11/1469
See application file for complete search history.

(56) References Cited

U.S. PATENT DOCUMENTS

| | | | | |
|---|---|---|---|---|
| 7,246,200 B1 * | 7/2007 | van Rietschote | ..... | G06F 9/4403 709/220 |
| 8,725,968 B2 * | 5/2014 | Wada | ...................... | G06F 3/061 711/158 |
| 9,058,293 B2 * | 6/2015 | Brown | .................. | G06F 3/0608 |
| 9,529,808 B1 * | 12/2016 | Sudarsanam | ..... | G06F 17/30088 |
| 2002/0144070 A1 * | 10/2002 | Watanabe | ............. | G06F 3/0617 711/165 |
| 2003/0028737 A1 * | 2/2003 | Kaiya | ................... | G06F 3/0601 711/162 |
| 2003/0065901 A1 * | 4/2003 | Krishnamurthy | ..... | G06F 3/0601 711/170 |
| 2008/0072003 A1 * | 3/2008 | Vu | ........................ | G06F 3/0617 711/162 |
| 2009/0222632 A1 * | 9/2009 | Sasage | ................ | G06F 11/1466 711/162 |
| 2010/0205390 A1 * | 8/2010 | Arakawa | ............... | G06F 3/0607 711/162 |
| 2010/0299491 A1 * | 11/2010 | Ueda | ..................... | G06F 3/0613 711/162 |
| 2011/0016271 A1 * | 1/2011 | Ash | ..................... | G06F 12/0866 711/113 |
| 2011/0191554 A1 * | 8/2011 | Sakai | .................... | G06F 3/0613 711/162 |

(Continued)

OTHER PUBLICATIONS

Harchol-Balter et al. "Size-Based Scheduling to Improve Web Performance." May 2003. ACM. ACM Transactions on Computer Systems. vol. 21. pp. 207-233.*

*Primary Examiner* — Nathan Sadler

(74) *Attorney, Agent, or Firm* — Van Pelt, Yi & James LLP

(57) ABSTRACT

Optimized remoting cloning is disclosed, including: receiving data from a source storage system associated with an ongoing replication process of a snapshot; and prior to the completion of the replication process of the snapshot, generating a set of metadata associated with a clone of the snapshot, wherein at least a portion of data comprising the snapshot that has been received at the destination storage system can be read using the clone while the replication process of the snapshot is ongoing.

19 Claims, 14 Drawing Sheets

(56) References Cited

U.S. PATENT DOCUMENTS

| | | | | |
|---|---|---|---|---|
| 2013/0097399 A1* | 4/2013 | Chhaunker | ............ | G06F 12/00 711/165 |
| 2014/0317367 A1* | 10/2014 | Abei | ...................... | G06F 3/065 711/162 |
| 2015/0234617 A1* | 8/2015 | Li | ........................ | G06F 3/0647 711/114 |
| 2016/0034508 A1* | 2/2016 | Aron | ................ | G06F 17/30327 707/626 |
| 2016/0085574 A1* | 3/2016 | Dornemann | ........ | G06F 11/1458 718/1 |

* cited by examiner

OPTIMIZED REMOTE CLONING

CROSS REFERENCE TO OTHER APPLICATIONS

This application claims priority to U.S. Provisional Patent Application No. 62/111,833 entitled MIGRATION OF DATA FILES IN SNAPSHOTS filed Feb. 4, 2015 which is incorporated herein by reference for all purposes.

BACKGROUND OF THE INVENTION

Typically, when moving data from one storage system to another, the data must be fully copied at the destination storage system before it can be accessed by clients of the destination storage system. Also, typically, portions of the data to be replicated are sent from the source storage system to the destination storage system in a relatively static order.

BRIEF DESCRIPTION OF THE DRAWINGS

Various embodiments of the invention are disclosed in the following detailed description and the accompanying drawings.

DETAILED DESCRIPTION

Figure 1:
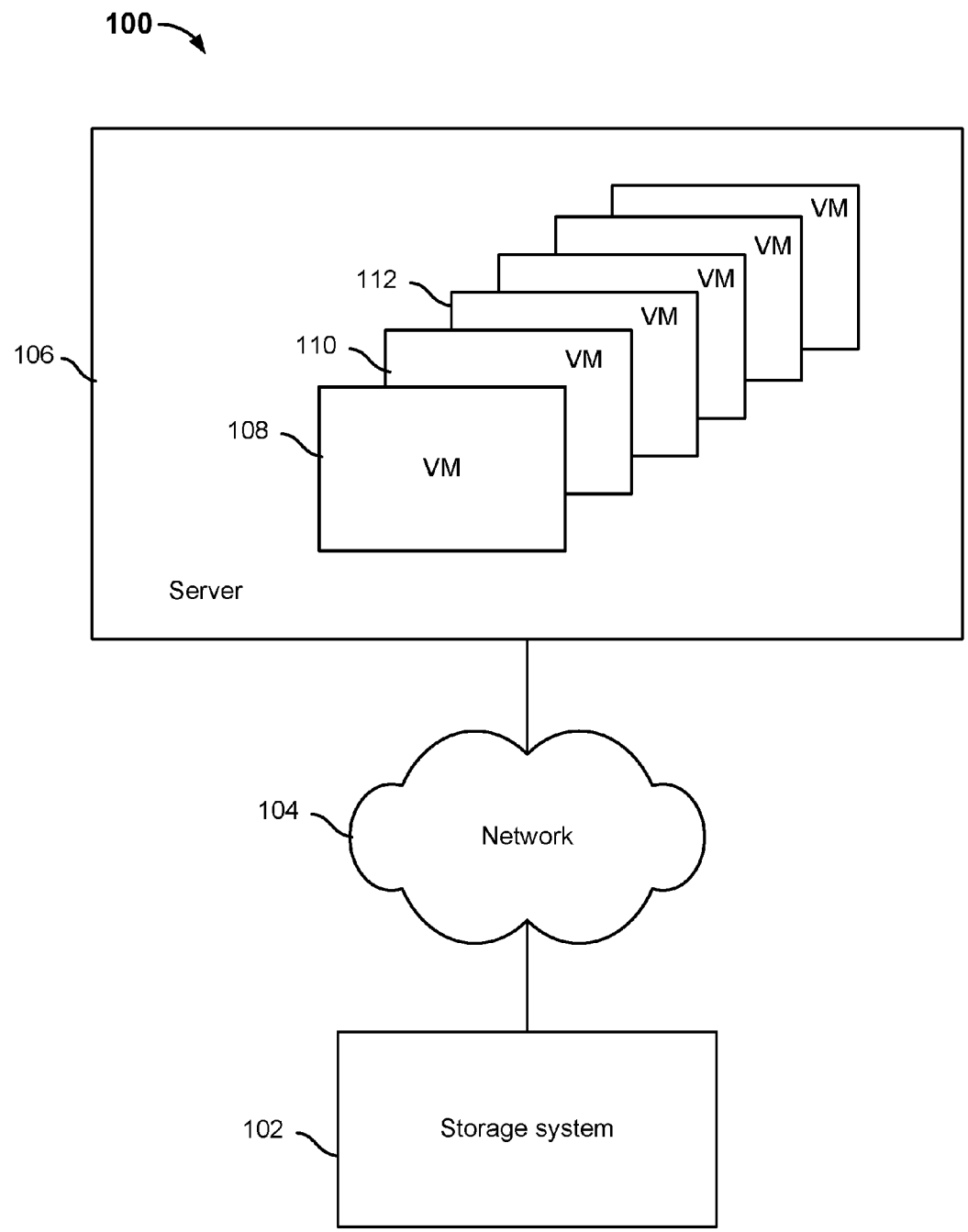
FIG. 1 is a diagram showing an embodiment of a storage system for the storage of VMs using virtual machine storage abstractions in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Replication of snapshot data is described herein. A replication of a snapshot from a source storage system to a destination storage system is initiated. In various embodiments, a snapshot comprises a point-in-time copy of a set of data. For example, the set of data may be associated with a virtual machine (VM) and/or a component of a VM (e.g., a virtual disk, a file). During the ongoing replication of the snapshot from the source storage system to the destination storage system, data associated with the snapshot is transferred from the source to the destination storage systems. Prior to the completion of the snapshot from the source storage system to the destination storage system, a set of metadata associated with a clone of the snapshot is generated at the destination storage system. As will be described in further detail below, the clone enables at least a portion of the snapshot data that has been received/replicated at the destination storage system to be read while the replication of the snapshot is still ongoing. Also, prior to the completion of the snapshot from the source storage system to the destination storage system, a first request to read a data value associated with the snapshot is received at the destination storage system. It is determined at the destination storage system that the data value associated with the first request has not yet been received at the destination storage system from the source storage system. In response to the determination that the data value associated with the first request has not yet been received at the destination storage system from the source storage system, a second request associated with prioritizing the transfer of the requested data value to the destination storage system is sent to the source storage system. As such, embodiments of replicating snapshot data that are described herein allow access to the snapshot data that is received at the destination storage system even prior to the completion of replicating the entire snapshot from the source storage system to the destination storage system.

FIG. 1 is a diagram showing an embodiment of a storage system for the storage of VMs using virtual machine storage abstractions in accordance with some embodiments. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the file system for the storage of VMs using virtual machine storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store meta-information identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Figure 2:
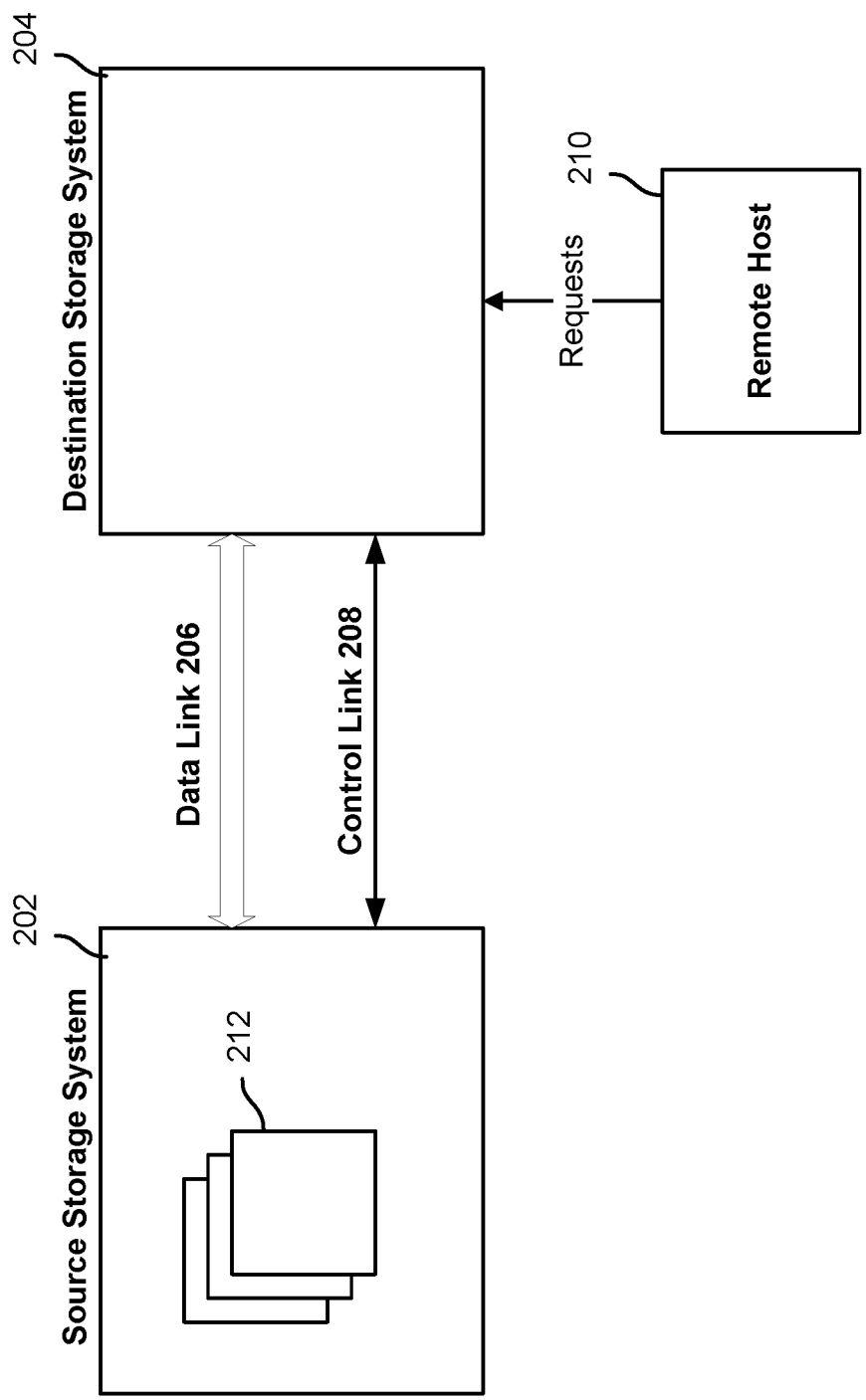
FIG. 2 is a diagram showing a source storage system and a destination storage system prior to the replication of snapshots from the source storage system to the destination storage system in accordance with some embodiments.

FIG. 2 is a diagram showing a source storage system and a destination storage system prior to the replication of snapshots from the source storage system to the destination storage system in accordance with some embodiments. In the example shown, source storage system 202 stores snapshot 212 that a user (or other entity) wishes to replicate to destination storage system 204. For example, snapshot 212 was generated from a set of data for the purpose of replicating the data at the destination storage system. In another example, snapshot 212 was pre-existing prior to the initiation of the replication process. For example, snapshot 212 may be a snapshot of a VM, a vdisk, and/or a file of a VM. In some embodiments, each of source storage system 202 and destination storage system 204 stores VM data. In various embodiments, data link 206 and control link 208 between source storage system 202 and destination storage system 204 are established over a network. Various network technologies can be used to establish data link 206 and control link 208. Example network technologies that can be used to establish data link 206 and control link 208 include various forms of Ethernet and FibreChannel. In some embodiments, traffic over data link 206 and control link 208 may be multiplexed on a single network link. Additionally, data link 206 and control link 208 may be implemented using one or multiple network connections at the transport level, for example, using TCP/IP (Transmission Control Protocol/Internet Protocol). In some embodiments, each of source storage system 202 and destination storage system 204 can be implemented as a storage system such as storage system 102 of FIG. 1.

In various embodiments, a request to replicate snapshot 212 from source storage system 202 and destination storage system 204 may be received at either source storage system 202 or destination storage system 204. In some embodiments, snapshot 212 is identified by a unique global identity that is maintained by all storage systems that store copies of the snapshot.

After the request to replicate snapshot 212 from source storage system 202 to destination storage system 204 is received, source storage system 202 is configured to first send metadata associated with snapshot 212 to destination storage system 204. In some embodiments, the metadata associated with snapshot 212 includes a count of the number of files in snapshot 212, the names and sizes of the files in snapshot 212, and information indicating which blocks of each snapshot of snapshot 212 actually include data. After source storage system 202 sends the metadata associated with snapshot 212 to destination storage system 204, source storage system 202 is configured to send portions of snapshot 212 to destination storage system 204 via data link 206 during the ongoing replication process until all the entirety of snapshot 212 has been transferred to and received at destination storage system 204. In some embodiments, portions of snapshot 212 comprise blocks of data that are present in snapshot 212. Blocks of data are present in snapshot 212 because they were written at some point in the history of the file(s) in snapshot 212. In some embodiments, source storage system 202 is configured to send the portions of snapshot 212 in a predetermined sequence to destination storage system 204. For example, the predetermined sequence may be associated with ascending block identity values. In another example, the predetermined sequence may be associated with the order in which the blocks of data were written. In various embodiments, the portions of snapshot 212, that form less than the entirety of snapshot 212, that have been received at destination storage system 204 are sometimes referred to as a "virtual snapshot" in that the snapshot is not entirely materialized physically at the destination storage system, at least not immediately after its creation, until the asynchronous replication of its content finishes.

In various embodiments, during the ongoing replication process of snapshot 212, destination storage system 204 is configured to generate a clone based on snapshot 212 at destination storage system 204. In various embodiments, a "clone" comprises a writable copy of a snapshot. In various embodiments, a "clone" comprises a set of metadata (e.g., a set of one or more indices) that references (e.g., point to) the snapshot on which it was based such that write operations to the clone are written to the clone's set of metadata and read operations to the clone are serviced from the snapshot if the reads cannot be serviced from the clone's own set of metadata. Put another way, in response to a read operation to the clone, if the requested data (e.g., a block) has been previously written to the clone, that data from the clone will be returned. Otherwise, if the requested data existed in the snapshot from which the clone was created, then the snapshot from which the clone was created will be consulted to obtain the value of the data. As such, the clone of snapshot 212 at destination storage system 204 does not comprise a physical copy of snapshot 212 and is therefore space-efficient.

As will be described in further detail below, data associated with snapshot 212 can be read by a client (e.g., remote host 210) from the clone of snapshot 212 during the ongoing replication process of snapshot 212 to destination storage system 204 (i.e., prior to the completion of replicating snapshot 212 to destination storage system 204). If a read operation, received from the client, is associated with one or more block(s) that are not present in the clone, then the blocks will be obtained from the data associated with snapshot 212 that have been replicated at destination storage system 204. If block(s) associated with the read operation are block(s) in snapshot 212 that have not yet been replicated at destination storage system 204, the read operation will be delayed until the data has been replicated at destination storage system 204. In various embodiments, destination storage system 204 is configured to send a request (e.g., a control message) to source storage system 202 over control link 208 to send the block(s) associated with the read operation to destination storage system 204 with a higher than usual priority from source storage system 202. For example, the block(s) associated with the read operation are originally to be sent from source storage system 202 to destination storage system 204 based on a predetermined sequence of ascending block identity values. However, in response to receipt of destination storage system 204's request to send the block(s) associated with the read operation to destination storage system 204 with a higher than usual priority, the block(s) associated with the read operation to destination storage system 204 could be sent sooner than they would have been based on the predetermined sequence. In some embodiments, before the destination storage system 204 sends a request to source storage system 202 over control link 208 to send the block(s) associated with the read operation to destination storage system 204 with a higher than usual priority from source storage system 202, destination storage system 204 is configured to first determine whether the block(s) associated with the read operation are even present in snapshot 212 based on the received metadata associated with snapshot 212. If the block(s) associated with the read operation are not found to be present in snapshot 212 based on the received metadata associated with snapshot 212, then destination storage system 204 will return appropriate data (e.g., all zero bytes) associated with indicating that no data has been written to block(s) associated with the read operation to the requestor (e.g., remote host 210).

In various embodiments, read operations for blocks which require communication between source storage system 202 and destination storage system 204 will require that the network over which control link 208 is implemented be in service. In cases where this does not occur, in some embodiments, read operations on destination storage system 204 will either block indefinitely, or, at the option of the storage system administrator, could be made to fail, depending on local requirements.

Figure 3:
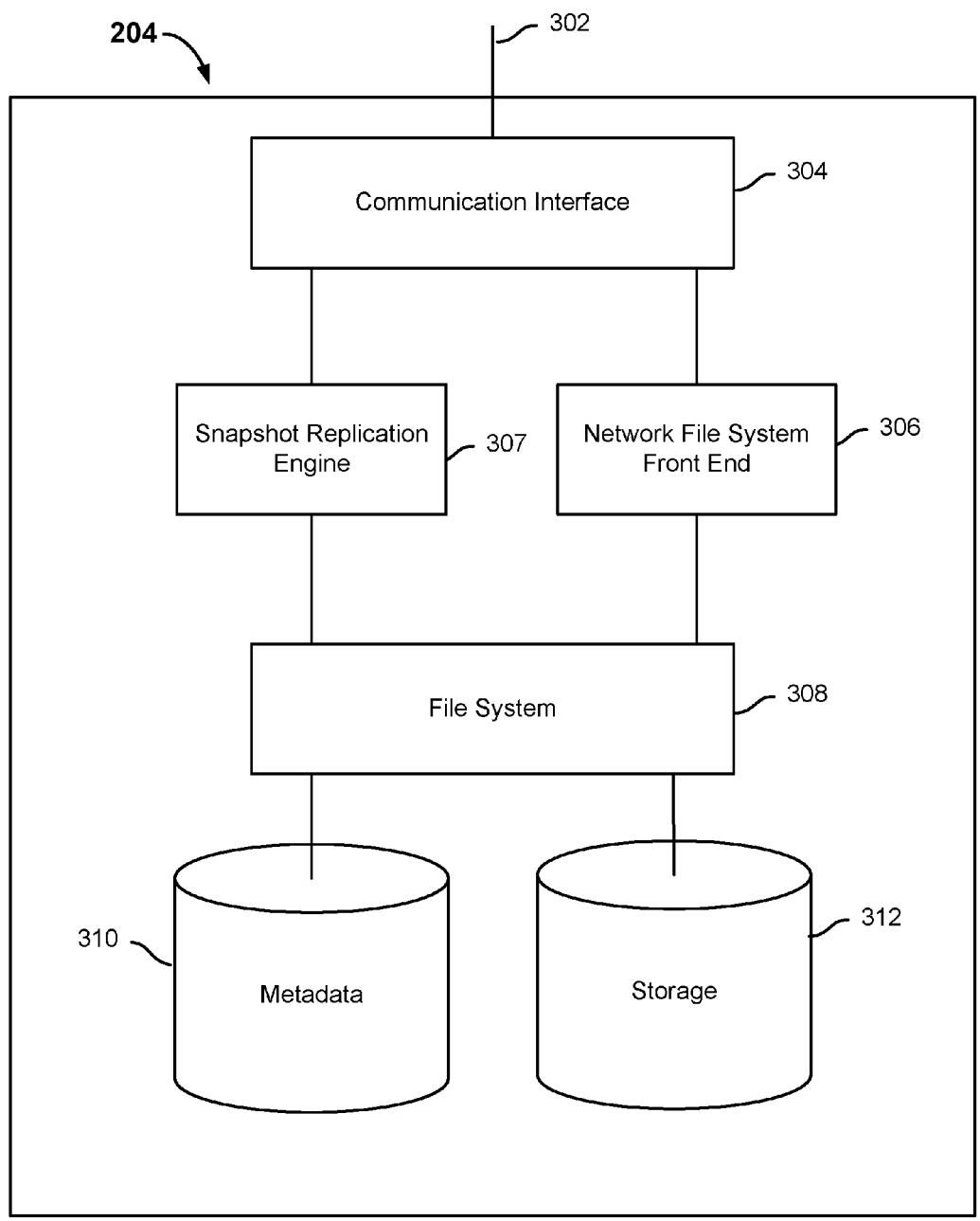
FIG. 3 is a block diagram illustrating an embodiment of a storage system including data and metadata in accordance with some embodiments.

FIG. 3 is a block diagram illustrating an embodiment of a storage system including data and metadata in accordance with some embodiments. Destination storage system 204 of FIG. 2 can be implemented using the example storage system of FIG. 3. In the example, the storage system 204 includes a network connection 302 and a communication interface 304, such as a network interface card or other interface, which enable the storage system to be connected to and communicate via a network such as network 104 of FIG. 1. The storage system 204 further includes a network file system front end 306 configured to handle NFS requests from virtual machines running on systems such as server 106 of FIG. 1. In various embodiments, the network file system front end is configured to associate NFS requests as received and processed with a corresponding virtual machine and/or vdisk with which the request is associated, for example, using meta information stored on storage system 204 or elsewhere. The storage system 204 includes a file system 308 configured and optimized to store VM data. In the example shown, metadata 310 comprises a database (or multiple databases) that is configured to store sets of metadata associated with various sets of data. For example, a set of metadata may be associated with a VM, a vdisk, or a file. Storage 312 may comprise at least one tier of storage. In some embodiments, storage 312 may comprise at least two tiers of storage, where the first tier of storage comprises flash or other solid state disk (SSD) and the second tier of storage comprises a hard disk drive (HDD) or other disk storage. In various embodiments, a set of metadata stored at metadata 310 includes at least one index that includes mappings to locations in storage 312 at which a set of data (e.g., VM, vdisk, or file) associated with the set of metadata is stored. In some embodiments, a set of metadata stored at metadata 310 includes at least an index that is a snapshot associated with a set of data stored in storage 312.

A clone may be generated based on a source set of data stored in storage 312. In various embodiments, the clone may be generated using a snapshot of the source set of data in the source data's set of metadata that is stored in metadata 310. In various embodiments, the snapshot of the source data from which a clone is generated is referred to as a "shared snapshot." A new set of metadata is created for the clone and data associating the clone (and/or the clone's set of metadata) with the set of metadata associated with the source data is stored at metadata 310. At least some of the metadata associated with the source data is shared with the clone. As will be described in further detail below, when a received request includes an operation (e.g., read or write) to access (e.g., a current state or to a past state of) data from a set of data (e.g., a VM, a vdisk, or a file), the set of metadata associated with that data is retrieved. In the event that the data associated with the request comprises a clone, then in some instances, at least a portion of the set of metadata associated with the source data may be accessed as well.

Snapshot replication engine 307 is configured to facilitate the replication of data associated snapshots from a source storage system to the storage system 204. In some embodiments, snapshot replication engine 307 is configured to receive metadata associated with a snapshot that is to be replicated at the storage system 204. In some embodiments, the metadata associated with the snapshot includes a count of the number of files in the snapshot to be replicated, the names and sizes of the files in the snapshot to be replicated, and information indicating which blocks of the snapshot to be replicated actually include data. In some embodiments, during the ongoing replication of the snapshot, the received portions of the snapshot are stored by snapshot replication engine 307 at storage 312 and a set of one or more indices that includes mappings to the locations in storage 312 at which the snapshot's physical data is stored is continuously updated by snapshot replication engine 307 at metadata 310. During the ongoing replication of the snapshot, snapshot replication engine 307 is configured to generate a clone based on the not yet completely received snapshot. In various embodiments, snapshot replication engine 307 generates the clone by creating a new set of one or more indices in metadata 310 that point to the set of indices associated with the snapshot in metadata 310. Clients interact with storage system 204 via file system 308 and make read or write requests. In some embodiments, read and/or write operations from clients are received over server message block (SMB), network file system (NFS), or Fibre Channel. Data associated with a write operation from a client of the storage system 204 to the clone is written by file system 308 to the set of indices associated with the clone. Data associated with a read operation from a client of the storage system 204 to the clone is serviced in one of several ways. If the data is present in storage 312, it is served directly from there. In some embodiments, read and/or write operations from clients are received over server message block (SMB), network file system (NFS), or Fibre Channel. However, if the requested data cannot be found in the set of indices associated with the snapshot at the storage system 204, then snapshot replication engine 307 is configured to send a request to the source storage system to send the blocks of data associated with the request to the storage system 204 with higher than usual priority. For example, the requested data blocks of the snapshot can then be sent by the source storage system next, out of a predetermined sequence, to the storage system 204. Snapshot replication engine 307 and file system 308 can then complete the read operation based on the requested data blocks of the snapshot that were sent with higher priority from the source storage system.

Figure 4:
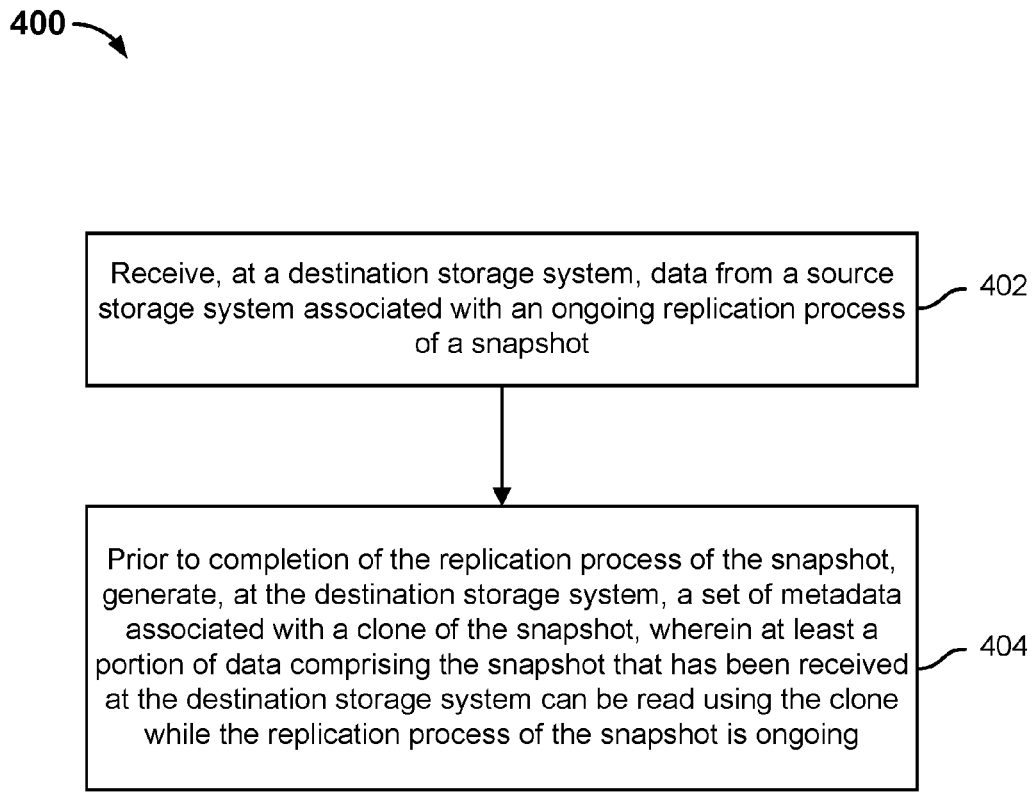
FIG. 4 is a flow diagram showing an embodiment of a process for replicating snapshot data in accordance with some embodiments.

FIG. 4 is a flow diagram showing an embodiment of a process for replicating snapshot data in accordance with some embodiments. In some embodiments, process 400 is performed wholly or partly by a storage system (e.g., storage system 102 of FIG. 1) and/or other processing system, for example, one configured to execute computer instructions that implement the steps of process 400.

At 402, data associated with an ongoing replication process of a snapshot is received at a destination storage system from a source storage system. In some embodiments, the data associated with the ongoing replication of a snapshot from a source to a destination storage system also includes receiving metadata associated with the snapshot at the destination storage system such as, for example, a count of the number of files in the snapshot to be replicated, the names and sizes of the files in the snapshot to be replicated, and information indicating which blocks of the snapshot to be replicated actually include data. In various embodiments, various portions (e.g., blocks containing data) of the snapshot are migrated from the source to the destination storage system during an ongoing replication process of the snapshot until the snapshot is entirely replicated at the destination storage system. In various embodiments, as portions of the snapshot are received at the destination storage system, the portions of the snapshot are stored at a physical storage device and a set of indices that stores mappings of logical offsets to the physical offsets at which the snapshot data is stored is continuously updated.

At 404, prior to completion of the replication process of the snapshot, a set of metadata associated with a clone of the snapshot is generated, wherein at least a portion of data comprising the snapshot that has been received at the destination storage system can be read using the clone while the replication process of the snapshot is ongoing. A clone of the snapshot that is not yet entirely replicated at the destination storage system is generated at the destination storage system. In various embodiments, generating the clone of the snapshot comprises generating a new set of one or more indices, associated with the clone, which points to the set of one or more indices associated with the snapshot at the destination storage system.

Prior to the completion of the replication process of the snapshot, a request to read a data value associated with the snapshot is received at the destination storage system. While the replication process of the snapshot is still ongoing, a read operation to the clone associated with data that is in the snapshot (e.g., data that cannot be found in the clone's set of indices) is received at the destination storage system.

It is determined at the destination storage system that the data value associated with the request has not yet been received at the destination storage system from the source storage system. The requested data is first searched in the clone but it is determined to be not available in the clone and so the clone's pointer to the one or more indices of the snapshot is used to access the snapshot data received at the destination storage system so far. However, it is determined that the requested data that is associated with the snapshot has not yet been received at the destination storage system and therefore, the read operation cannot be serviced until the requested data is received at the destination storage system.

A request associated with prioritizing transfer of the requested data value to the destination storage system is sent from the destination storage system to the source storage system. The destination storage system sends a request (e.g., a control message) to the source storage system to send the requested data with higher than usual priority. In various embodiments, sending the requested data with higher than usual priority refers to sending the requested data sooner than would have been done based on the predetermined sequence in which portions of the snapshot are normally sent to the destination storage system during the ongoing replication process. Therefore, the transfer of data of the snapshot that is associated with the read operation at the destination storage system can be expedited during the ongoing replication process and can be used to complete a read operation at the destination storage system before the replication process is completed.

As such, process 400 describes a process in which a snapshot is "filled in" in the background while it is made accessible via a clone at a destination storage system.

Figure 5:
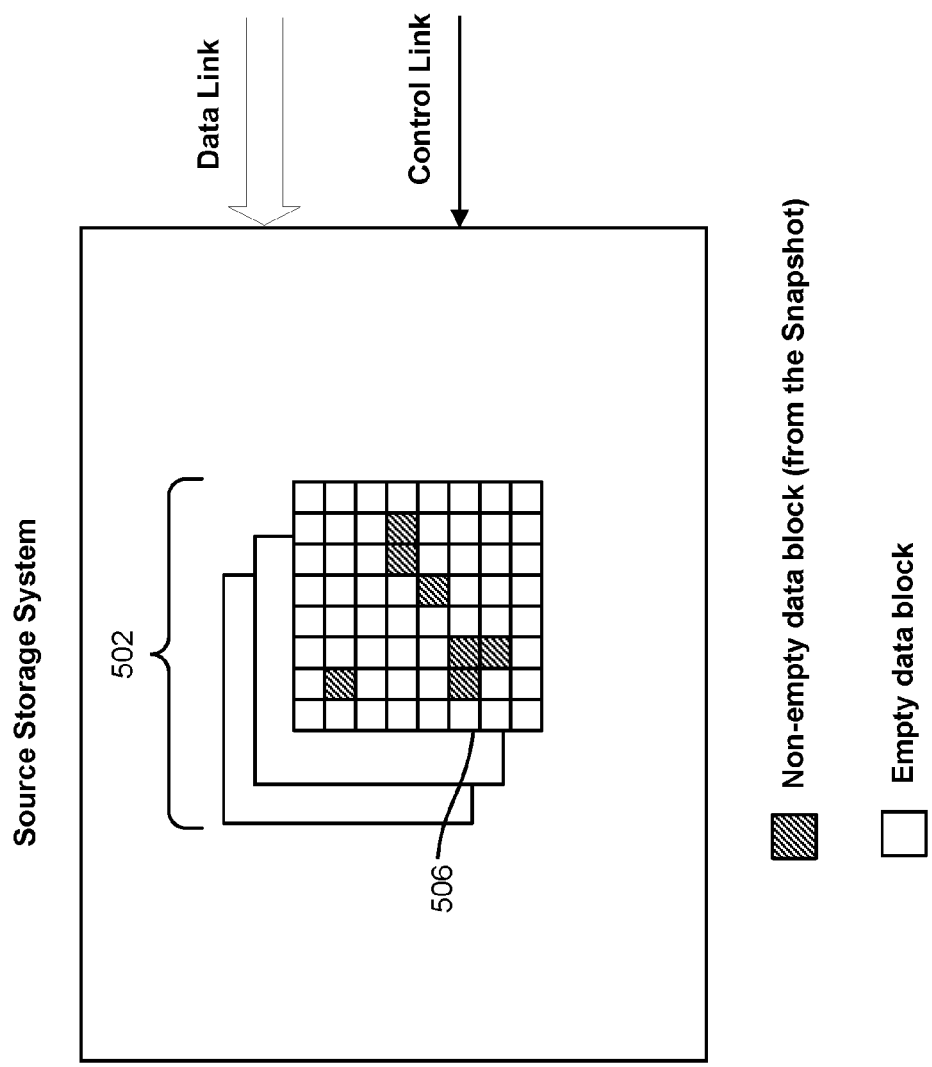
FIG. 5 is a diagram showing an example of a snapshot at a source storage system in accordance with some embodiments.

FIG. 5 is a diagram showing an example of a snapshot at a source storage system in accordance with some embodiments. In the example, the source storage system has a data link and a control link established with a destination storage system (that is not shown in the diagram). The source storage system stores snapshot 502, which comprises three component files. In various embodiments, snapshot 502 comprises physical data stored on a physical storage device of the three component files at a point-in-time and an index (e.g., a B-tree or other data structure) that includes mappings from logical offsets to the physical locations on the storage device at which the snapshotted data is stored. In various embodiments, snapshot 502 is associated with a unique global identity that is maintained by all storage systems that store copies of the snapshots. Snapshot 502 comprises multiple blocks, at least some of which have data that is present (i.e., have data written to those blocks). As mentioned above, blocks are present in a snapshot because they were written at some point in the history of the file(s) in the snapshot. In some embodiments, each block in a snapshot is associated with a block identity. In some embodiments, a block's identity is determined by a combination of the identity of the file containing the block, the numeric byte offset of the location of the block in the file, and the size of the block. The blocks associated with a snapshot are shown for component file 506 in the example and where a block of data is present, that block is referred to as being "non-empty" and filled in and where a block includes no data (i.e., is not present), that block is referred to as being "empty" and left blank. In the event that snapshot 502 is requested to be replicated at a destination storage system (that is not shown in the diagram), the source storage system is configured to send metadata corresponding to snapshot 502 to the destination storage system prior to sending the corresponding data of snapshot 502 to the destination storage system. In various embodiments, the metadata of a snapshot comprises a count of the files in the snapshot, the names and sizes of the files in the snapshot, and information indicating which blocks of the snapshot actually include data (i.e., which blocks of the snapshot are non-empty/present).

Figure 6:
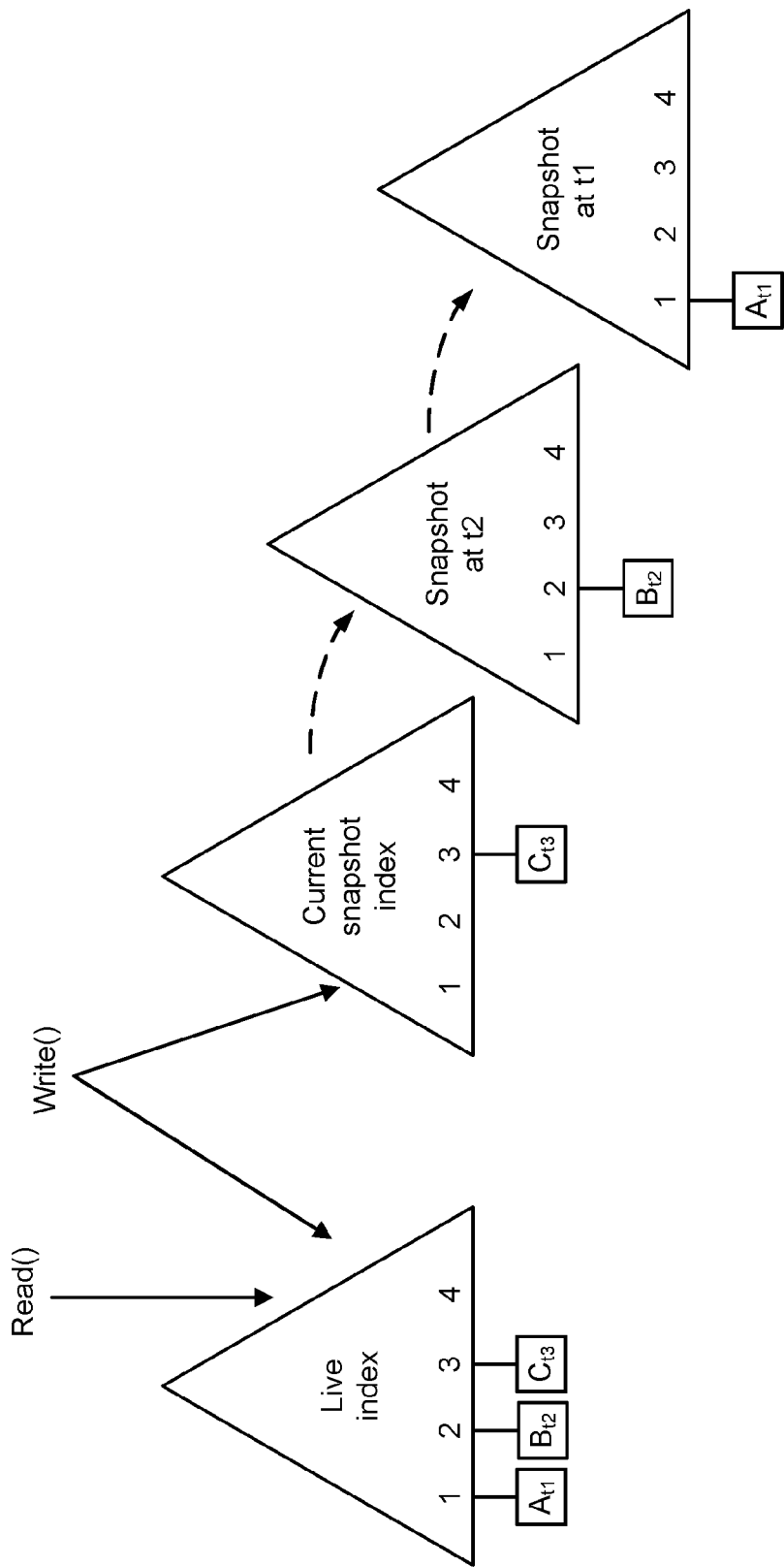
FIG. 6 is a diagram showing an example of a set of metadata, including snapshots, associated with a set of data in accordance with some embodiments.

FIG. 6 is a diagram showing an example of a set of metadata, including snapshots, associated with a set of data in accordance with some embodiments. In the example, the set of metadata may be associated with a file. In some embodiments, to conserve storage space, a snapshot stores the new data written to the file since the previous snapshot of the file was generated. In some embodiments, snapshot 502 of FIG. 5 can be implemented using the description of a snapshot as provided with FIG. 6.

The following describes examples of the indices (which are also sometimes collectively referred to as a "set of metadata") that are to be used to represent the data, both current and also related to snapshots, associated with a file (or a VM or a vdisk):

In the example, the set of metadata includes a live index, a current snapshot index, a snapshot at time t2, and a snapshot at time t1. In the example, data associated with the file may be stored at locations 1, 2, 3, and 4.

Metadata may be thought of as the mapping used to translate a logical location (e.g., a logical offset) to a physical location (e.g., a physical offset) for data that a user may have written. In various embodiments, the metadata may be organized as an efficient index data structure such as a hash table or a B-tree. For example, the relationship between a logical offset of a data, the index, and the physical offset of the data may be described as follows: logical-offset→INDEX→physical-offset.

In various embodiments, each set of metadata includes two active indices: the "live index" and "current snapshot index." The live index and the current snapshot index are active in the sense that they can be modified. In some embodiments, the live index stores all offsets that are currently mapped in the file, while the current snapshot index stores all offsets in the file that have been mapped since the previous snapshot was created. Put another way, the live index acts as a cache of all the mappings for the current state of the file. A snapshot is typically a read-only file, but the current snapshot index is modifiable until the next prescribed snapshot creation event occurs. For example, a prescribed snapshot creation event may be configured by a user and may comprise the elapse of an interval of time, the detection of a particular event, or a receipt of a user selection to create a new snapshot. Once the next prescribed snapshot creation event is reached, the state of the current snapshot index is preserved to create a new snapshot and a new empty current snapshot index is created. In some embodiments, write operations to the set of data result in the update of both the live and current indices. In some embodiments, read operations of the current state of the set of data result in the search of only the live index. Read operations of a past state of the set of data result in a search through the series of snapshots. In various embodiments, each index is searched in a prescribed manner.

In some embodiments, a snapshot of a file is the point-in-time state of the file at the time the snapshot was created. A snapshot of a VM is the collection of file-level snapshots of files that comprise the VM. In some embodiments, a snapshot is represented as an index that stores mappings to the data that was modified after the previous snapshot was created. In other words, in some embodiments, each snapshot only includes the updates to a file (i.e., deltas) for a given time period (since the creation of the previous snapshot). As a result, the snapshot may be represented by a compact space-efficient structure.

As mentioned above, when a snapshot is created, the current snapshot index becomes the index of the snapshot, and a new empty current snapshot index is created in preparation for the next snapshot. Each snapshot is linked to the next younger and next older snapshot. In some embodiments, the links that go backward in time (i.e., the links to the next older snapshots) are traversed during snapshot and clone read operations.

Returning to the example of FIG. 6, the current snapshot index is linked (e.g., points to) to the snapshot at time t2 and the snapshot at time t2 is linked to the snapshot at time t1. Read operations to the current state of the file are serviced from the live index, while write operations to the file update both the live and current snapshot indices. In the example of FIG. 6, data A is written at time t1 at location 1 and then the snapshot at time t1 is created. The data B is written at time t2 at location 2 and then the snapshot at time t2 is created. The data C is written at time t3 at location 3 and tracked in the current snapshot index. The live index tracks the current state of the data of the file at each of the locations 1, 2, 3, and 4 and may be updated each time that data is written to a location associated with the file. As such, the live index includes data A at location 1, data B at location 2, data C at location 3, and no data at location 4 because data has not been written to the file at location 4. For example, if a new data D (not shown) is to overwrite the data currently at location 3, data C, at time t4, then location 3 of the current snapshot index would be updated to map to data D and location 3 of the live index would also be updated to map to data D.

In various embodiments, a read operation on a specified snapshot for a logical block offset may proceed in the following manner: First, a lookup of the specified snapshot index is performed for the logical block offset of the read operation. If a mapping exists, then data is read from the physical device at the corresponding physical address and returned. Otherwise, if the mapping does not exist within the specified snapshot index, the link to the next older snapshot is traversed and a search of this older snapshot's index is performed. This process continues until a mapping for the logical block offset is found in a snapshot index or the last snapshot in the chain has been examined.

The use of the live index greatly enhances the efficiency of reading the current state of the file. To illustrate this, first assume that the live index of FIG. 6 is not used. In a first example of performing a read operation without using the live index of FIG. 6, we attempt to perform a read operation to access the current data associated with location 1. First, a lookup of a mapping to the data associated with location 1 is performed in the current snapshot index. However, such a mapping is not found in the current snapshot index and so the link to the next older snapshot, the snapshot at time t2, is traversed and a search for the mapping to data associated with location 1 is performed. Again, such a mapping is not found in the snapshot at time t2 and so the link to the next older snapshot, the snapshot at time t1, which is also the last snapshot in the chain, is traversed and a search for the mapping to data associated with location 1 is performed. The data associated with location 1, data A, is found in snapshot t1 and data A is accessed to complete the read operation. As described in this example, without using the live index, the data associated with location 1 was found after the expensive traversals from the current snapshot index, to the snapshot at time t2, and then to the snapshot at time t1. However, if the live index of FIG. 6 is used, then a search for the data associated with location 1 may be first performed in the live index. Using the live index, data A associated with location 1 is quickly located without needing to perform any traversals between indices.

In a second example of performing a read operation without using the live index of FIG. 6, we attempt to perform a read operation to access the current data associated with location 4. First, a lookup of a mapping to the data associated with location 4 is performed in the current snapshot index. However, such a mapping is not found in the current snapshot index and so the link to the next older snapshot, the snapshot at time t2, is traversed and a search for the mapping to data associated with location 4 is performed. Again, such a mapping is not found in the snapshot at time t2 and so the link to the next older snapshot, the snapshot at time t1, which is also the last snapshot in the chain, is traversed and a search for the mapping to data associated with location 4 is performed. Yet again, such a mapping is not found in the snapshot at time t1 and so a message that indicates that no data is stored for location 4 is returned for the read operation. As described in this example, without using the live index, the data associated with location 4 was not located even after the expensive traversals from the current snapshot index all the way to the last snapshot in the chain, the snapshot at time t1. However, if the live index of FIG. 6 is used, then a search for the data associated with location 4 may be first performed in the live index. Using the live index, it is quickly apparent that no data has been stored for location 4 and therefore an appropriate message can be returned for the read operation without needing to perform any costly traversals between indices. An example in which a read operation may attempt to read data from a location for which no data has been stored is in a distributed system in which a first node may attempt to read data at a location associated with a second node and unbeknownst to the first node, the second node never stored any data at that location. In some embodiments, a live index is optionally implemented for a set of data.

In some embodiments, snapshot 502 of FIG. 5 can also be implemented using schemes other than what is provided with FIG. 6.

Figure 7:
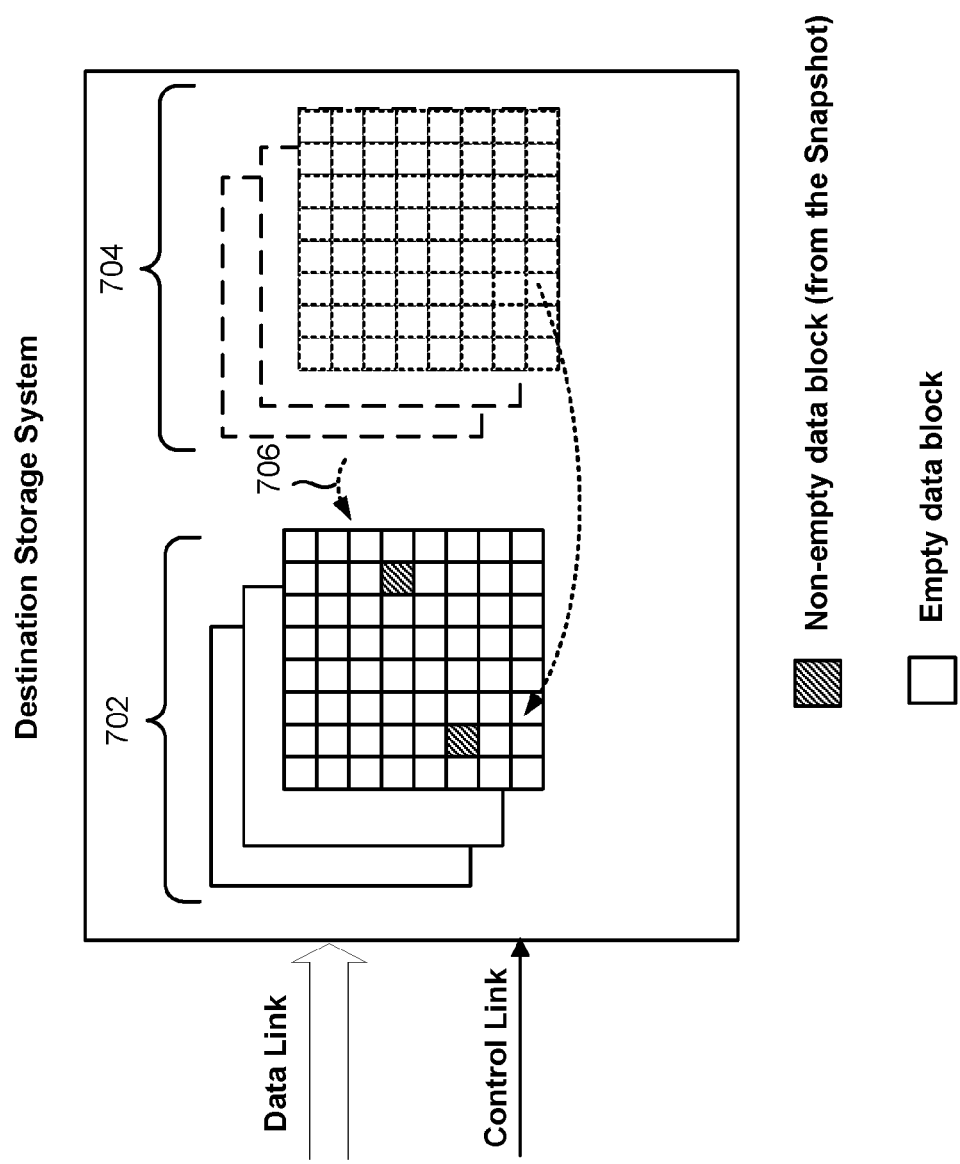
FIG. 7 is a diagram showing an example of data of a snapshot being replicated at a destination storage system during an ongoing replication process in accordance with some embodiments.

FIG. 7 is a diagram showing an example of data of a snapshot being replicated at a destination storage system during an ongoing replication process in accordance with some embodiments. In the example, the destination storage system has a data link and a control link established with a source storage system (that is not shown in the diagram). In this ongoing replication process, two blocks of data of snapshot 702 have already been received at the destination storage system, while other blocks of snapshot 702 are still being transferred from the source storage system based on a predetermined sequence. After the initiation of the replication of snapshot 702 to the destination storage system, clone 704 is generated based on snapshot 702, for which data has not been completely replicated at the destination storage system. Clone 704 comprises a writable copy of snapshot 702 in the sense that clone 704 comprises a new set of indices that points back to the (one or more indices of) snapshot 702 with pointer 706. New data written to clone 704 by clients will be stored in the indices of clone 704 and not propagated back to snapshot 702, thereby preserving the integrity of snapshot 702's data.

A client (that is not shown in the diagram) could access the data associated with snapshot 702, during the ongoing replication of snapshot 702 at the destination storage system, by sending a read request to clone 704. In some embodiments, the clone is exposed to the client by the destination storage system notifying the hypervisor of the clone's existence. In some embodiments, the clone is exposed to the client by the destination storage system making the clone visible in the file system of the destination storage system. The destination storage system will determine whether the requested data can be found in clone 704 and if the requested data cannot be found in clone 704, then the destination storage system uses pointer 706 to locate snapshot 702 and searches for the requested data in the blocks of data of snapshot 702 that have been transferred to the destination storage system so far. If the requested data cannot be located in the blocks of data of snapshot 702 that have been transferred to the destination storage system so far, the destination storage system can send a request (e.g., a control message), over the control link, to the source storage system for the source storage system to send the requested data with higher than usual priority over the data link to the destination storage system. Sending the requested data with higher than usual priority over the data link to the destination storage system comprises sending the requested data sooner than the requested data would have been sent based on the predetermined sequence in which the blocks of data of snapshot 702 would have been originally sent. Once the requested data is received at the destination storage system, the destination storage system can write the data into snapshot 702 at the destination storage system and return the requested data to the requesting client.

Figure 8:
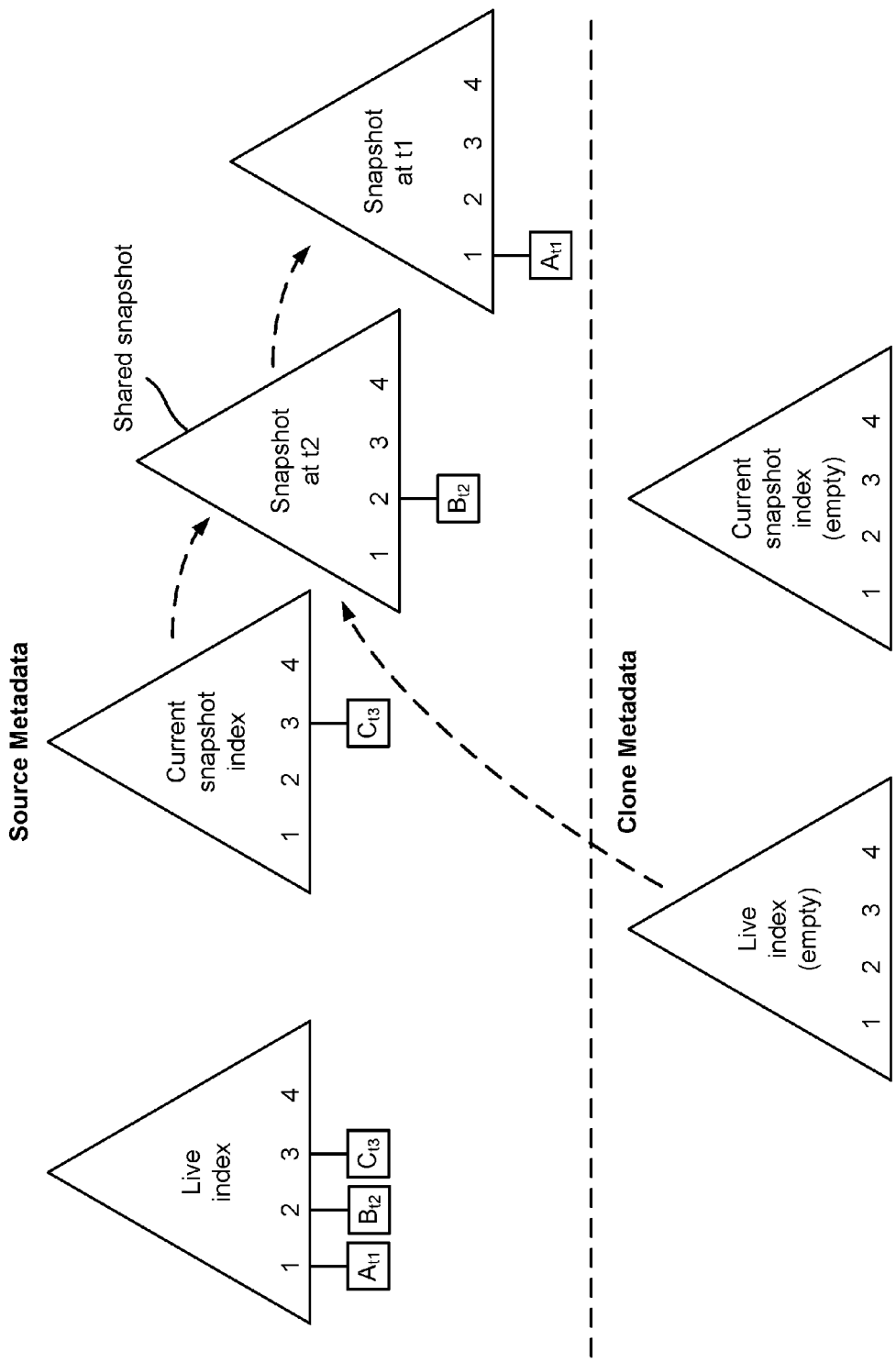
FIG. 8 is a diagram showing an example of a set of metadata associated with source data and a set of metadata associated with a clone in accordance with some embodiments.

FIG. 8 is a diagram showing an example of a set of metadata associated with source data and a set of metadata associated with a clone in accordance with some embodiments.

As previously described, in some embodiments, in order to reduce metadata and data space consumption, snapshots are represented in a compact format that only stores the changes that have been made to the associated set of data since the previous snapshot was created. In various embodiments, to conserve storage space, a clone comprises a new set of indices that points back to the index associated with the snapshot on which it was based. In some embodiments, clone 704 of FIG. 7 can be implemented using the description of a clone as provided with FIG. 8.

The following describes examples of the indices (which are also sometimes collectively referred to as a "set of metadata") that can be used to represent the data of a clone that was generated from a snapshot of a file (or a VM or a vdisk):

The set of metadata associated with the source data (the source metadata) includes a live index, a current snapshot index, a snapshot at time t2, and a snapshot at time t1. In the example, the clone is created from the snapshot at time t2 of the source metadata. Therefore, the snapshot at time t2 is now also referred to as a shared snapshot because it is now shared between the source data and its clone. While not shown in the example, one or more other clones besides the one shown may be created from the snapshot at time t2 of the source metadata. In some embodiments, each snapshot has an associated reference count that tracks the total number of clones that have been created from the snapshot. After a clone creation operation has completed, the reference count of the shared snapshot is incremented by the number of new clones that were created from the snapshot. When a clone is deleted, the reference count associated with the shared snapshot from which the clone was created is decremented by one. As will be described in further detail below, the reference count of a shared snapshot is considered when it is determined whether the shared snapshot should be deleted. For example, a snapshot cannot be deleted if it has a non-zero reference count, thus preserving the data shared by the clones.

In various embodiments, creating clones (e.g., of snapshots of VMs) does not require copying metadata and/or data. Instead, a new empty live index and a current snapshot index are created for each clone. Furthermore, information associating the live index of each clone with the shared snapshot of the source data is stored. The information associating the live index of the clone with the shared snapshot may be stored with the clone metadata, the source metadata, or elsewhere. For example, the associating data is a pointer or another type of reference that the live index of each clone can use to point to the index of the shared snapshot from which the clone was created. This link to the shared snapshot is traversed during reads of the clone. As shown in the example of FIG. 8, an empty live index and an empty current snapshot index are created for the new clone. The live index of the clone points back to the shared snapshot of the source data, the snapshot at time t2. The live index and the current snapshot index of the clone will remain empty until new data is written to the clone or existing data of the source data is modified for the clone. A write operation of new data to the clone will result in updating both the live index and the current snapshot index of the clone. A read operation to the clone is performed differently than a read operation to a non-clone due to the fact that some of the clone's current (live) data may reside in the snapshot from which it was generated rather than an index of the clone. As such, if the requested data of a read operation to a clone cannot be found in the clone's own indices, then the search continues at the snapshot from which it was generated. In some embodiments, a live index is optionally implemented for a clone.

Figure 9:
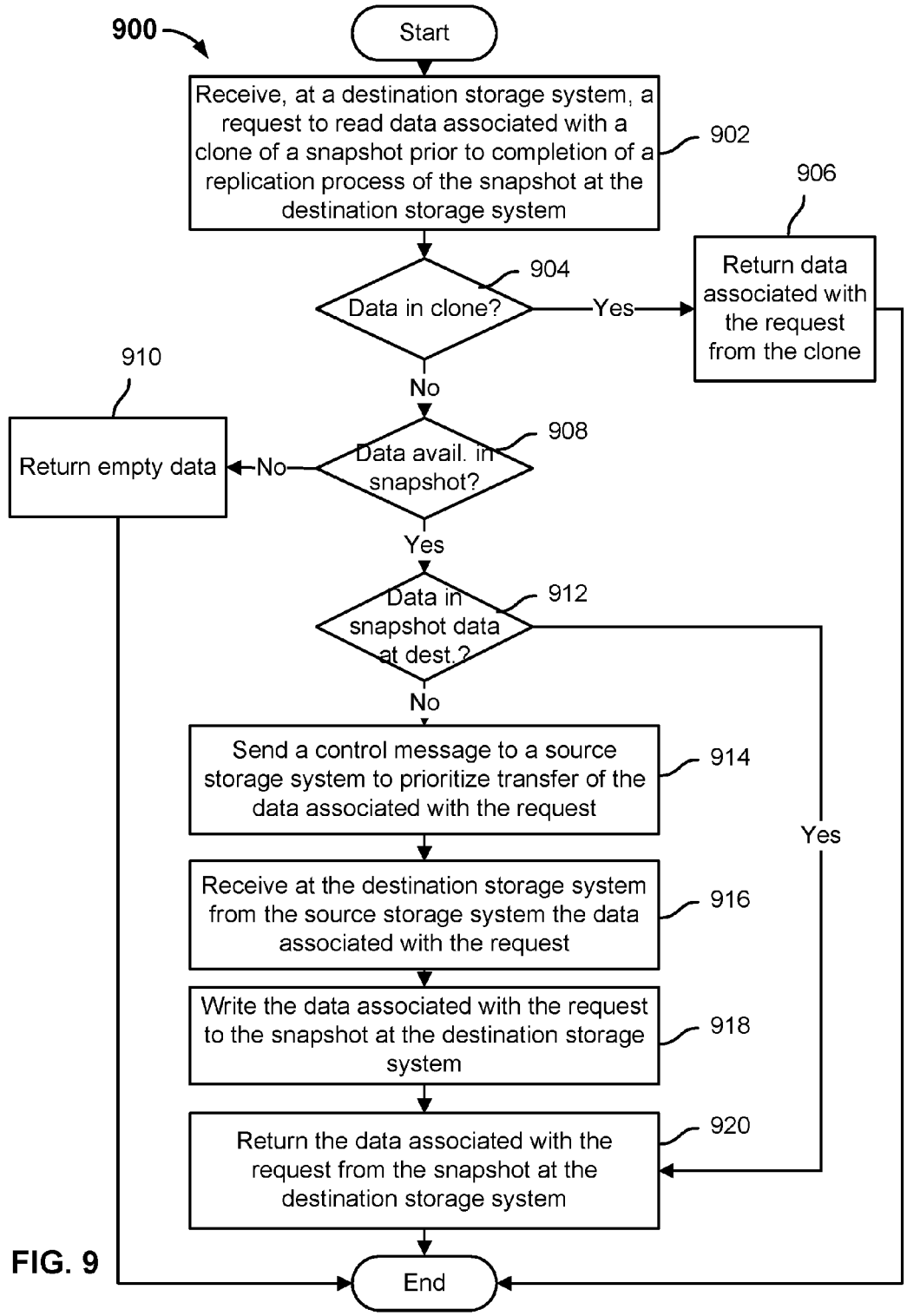
FIG. 9 is a flow diagram showing an example of reading from a clone generated from a snapshot associated with an ongoing replication at a destination storage system in accordance with some embodiments.

FIG. 9 is a flow diagram showing an example of reading from a clone generated from a snapshot associated with an ongoing replication at a destination storage system in accordance with some embodiments. In some embodiments, process 900 is performed wholly or partly by a storage system (e.g., storage system 102 of FIG. 1) and/or other processing system, for example, one configured to execute computer instructions that implement the steps of process 900. In some embodiments, process 900 is performed after executing process 400 of FIG. 4.

Process 900 can be implemented to perform a read of one or more blocks of data of a snapshot that is in the process of being replicated from a source storage system to a destination storage system.

At 902, a request to read data associated with a clone of a snapshot, prior to completion of a replication process of the snapshot at a destination storage system, is received at the destination storage system. The read request is received at the destination storage system from a client while the replication of the snapshot is still ongoing (e.g., less than all blocks of data of the snapshot have been transferred from the source storage system to the destination storage system). The read request identifies one or more blocks of data using block identities (e.g., a combination of the identity of the file containing the block and the numeric byte offset of the location of the block in the file).

At 904, it is determined whether data associated with the request is located in the clone. The requested data is first looked for in the clone (e.g., one or more indices of the clone). In the event that the data associated with the request is located in the clone, control is transferred to 906, at which the data is returned from the clone to the requesting client. Otherwise, in the event that the data associated with the request is not located in the clone, control is transferred to 908.

At 908, it is determined whether the data associated with the request is available in the snapshot. If the requested data is not found in the clone, then the information previously received at the destination storage system from the source storage system that indicates in which blocks of the snapshot data is present data is checked to determine whether data is even present (available) in the one or more blocks of the snapshot that are identified in the read request. In the event that the data associated with the request is available in the snapshot, control is transferred to 912. If data is present (available) in the one or more blocks of the snapshot that are identified in the read request, then the process continues. Otherwise, in the event that the data associated with the request is not available in the snapshot, control is transferred to 910, at which empty data (e.g., a block of data comprising all zero bytes) is returned to the requesting client and the process ends.

At 912, it is determined whether the data associated with the request is located in the data of the snapshot that has been received at the destination storage system so far. The requested data is checked in the snapshot index (as previously described) covering the portion of the snapshot that has been received at the destination storage system so far in the replication process. In the event that the data associated with the request is located in the data of the snapshot that has been received at the destination storage system so far, control is transferred to 920. Otherwise, in the event that the data associated with the request is not located in the data of the snapshot that has been received at the destination storage system so far, control is transferred to 914.

At 914, a control message is sent to a source storage system to prioritize transfer of the data associated with the request. Given that the requested data is not among the portion of the snapshot that has been received at the destination storage system so far in the replication process, a control message is sent to expedite the transfer of the requested data to the destination storage system. In response to the control message, the source storage system will send the requested data to the destination storage system sooner than it would have otherwise based on a predetermined sequence of sending the blocks of data of the snapshot.

At 916, the data associated with the request is received at the destination storage system from the source storage system. The data associated with the one or more blocks of the snapshot that are identified in the read request is received at the destination storage system.

At 918, the data associated with the request is written to the snapshot at the destination storage system. The received data associated with the one or more blocks of the snapshot is written to those blocks at the snapshot at the destination storage system.

At 920, the data associated with the request is returned from the snapshot at the destination storage system.

Figure 10:
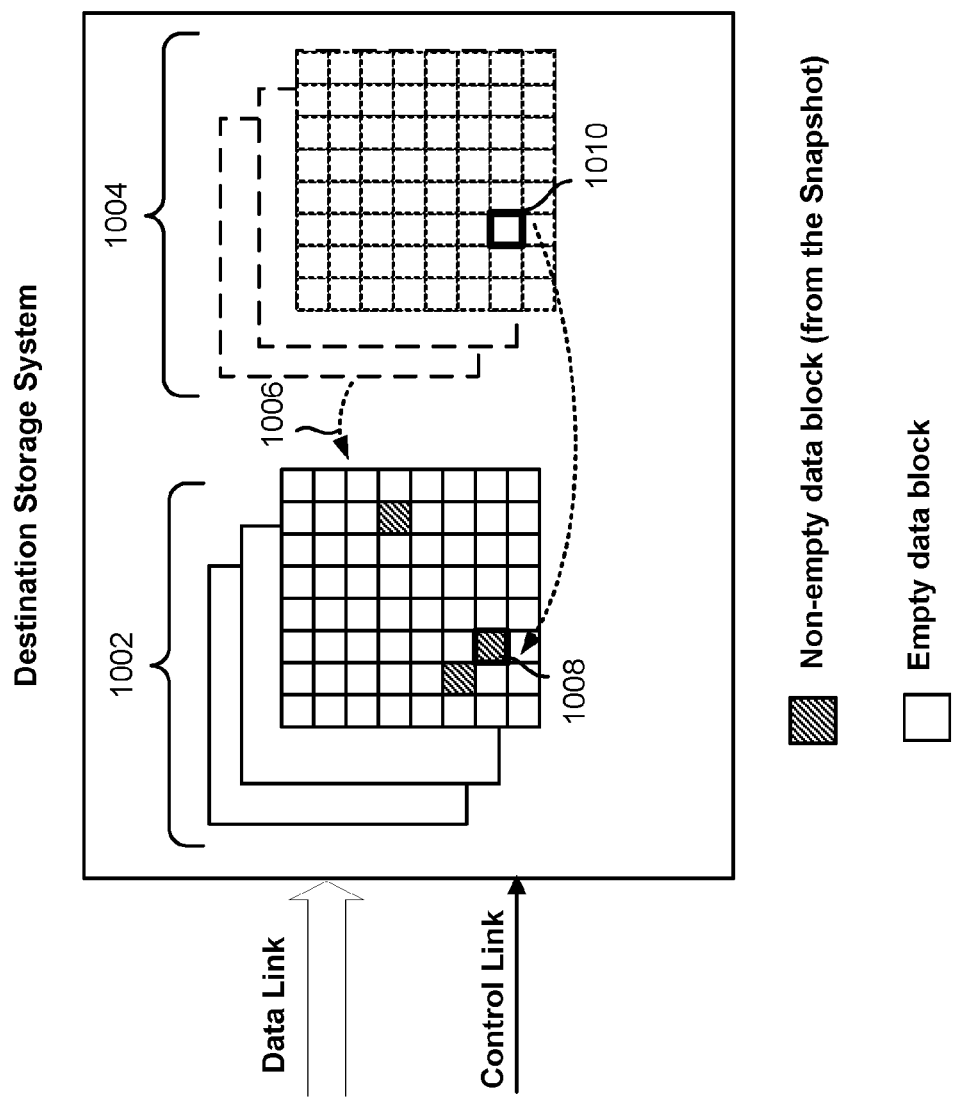
FIG. 10 is a diagram showing an example of reading from a clone of a snapshot at a destination storage system during the ongoing replication of the snapshot at the destination storage system in accordance with some embodiments.

FIG. 10 is a diagram showing an example of reading from a clone of a snapshot at a destination storage system during the ongoing replication of the snapshot at the destination storage system in accordance with some embodiments. For example, process 900 of FIG. 9 can be used to perform the read in the example of FIG. 10. In this ongoing replication process, two blocks of data of snapshot 1002 have been received at the destination storage system so far, while other blocks of snapshot 1002 are still being transferred from the source storage system based on a predetermined sequence. Clone 1004 has been generated from snapshot 1002 and pointer 1006 has been established between clone 1004 and snapshot 1002. A read request to block 1010 of clone 1004 is received at the destination storage system from a client (that is not shown in the diagram). Block 1010 is checked at clone 1004 but no data is found. As such, in some embodiments, the destination storage system next checks information previously received from the source storage system that indicated which blocks of snapshot 1002 have data present. Block 1008 of snapshot 1002 corresponds to the identity of block 1010 of clone 1004. It is then determined that block 1008 of snapshot 1002 does have data present and so the destination storage system checks block 1008 among the data of snapshot 1002 that has been received so far. Since the data of block 1008 of snapshot 1002 has not yet been received at the destination storage system, the destination storage system sends a request (e.g., a control message), over the control link, to the source storage system to request a prioritized transfer of the data of block 1008 of snapshot 1002 to the destination storage system. Once the data of block 1008 of snapshot 1002 is received at the destination storage system, the data of block 1008 is written to snapshot 1002 and also returned to the requesting client.

Figure 11:
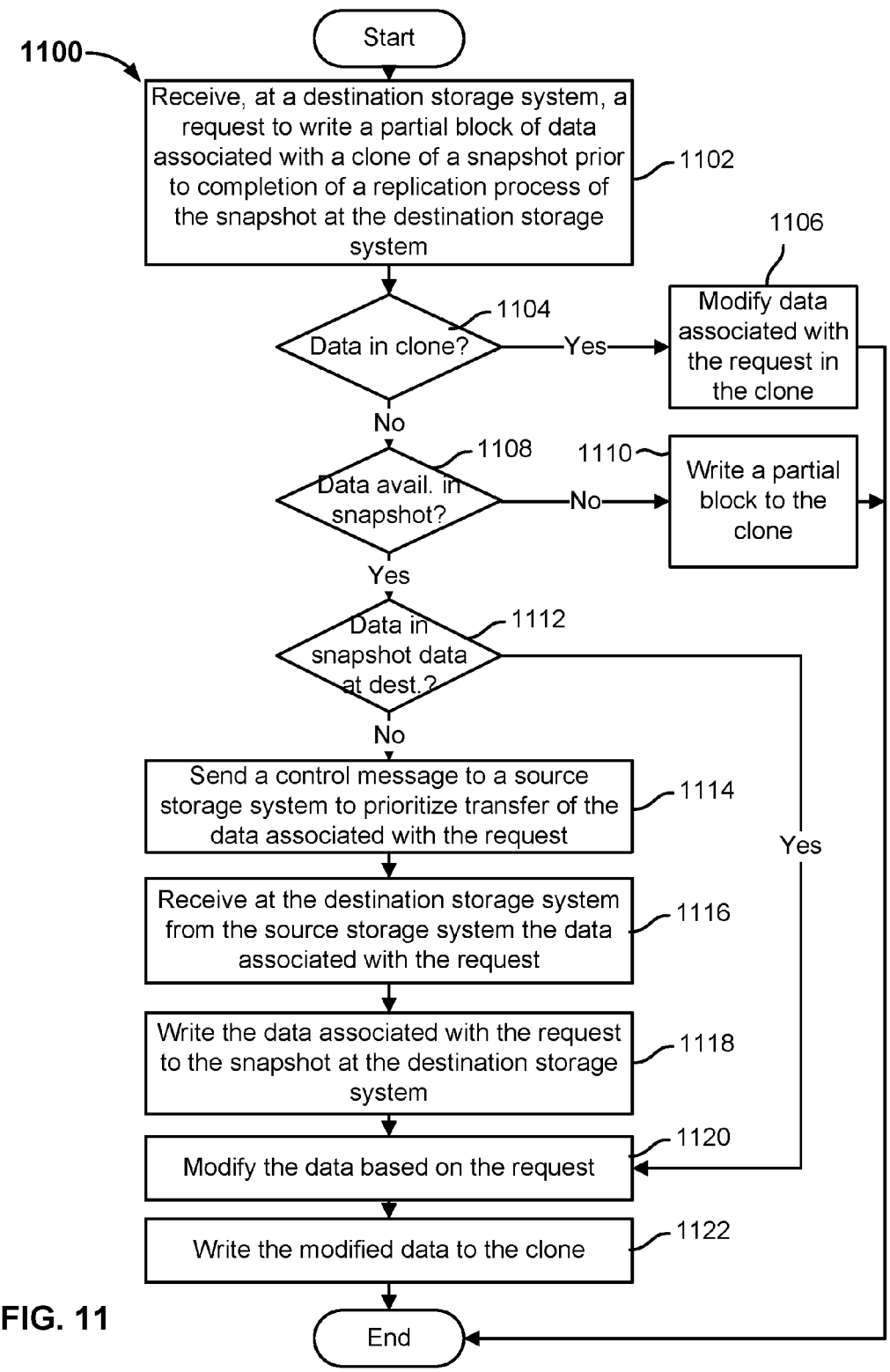
FIG. 11 is a flow diagram showing an example of writing a partial block of data to a clone generated from a snapshot associated with an ongoing replication at a destination storage system in accordance with some embodiments.

FIG. 11 is a flow diagram showing an example of writing a partial block of data to a clone generated from a snapshot associated with an ongoing replication at a destination storage system in accordance with some embodiments. In some embodiments, process 1100 is performed wholly or partly by a storage system (e.g., storage system 102 of FIG. 1) and/or other processing system, for example, one configured to execute computer instructions that implement the steps of process 1100. In some embodiments, process 1100 is performed after executing process 400 of FIG. 4.

Process 1100 can be implemented to perform a "partial block write" to one or more blocks of data of a snapshot that is in the process of being replicated from a source storage system to a destination storage system. In various embodiments, a "partial block write" involves reading data from a block and modifying only a portion of that block, as opposed to the entire block of data. Process 1100 is similar to process 900 of FIG. 9, but process 1100 further includes modifying a block of data read from the snapshot, if data is present in the requested block of data, and writing the modified block of data to the clone, as will be described below.

At 1102, a request to modify data associated with a clone of a snapshot, prior to completion of a replication process of the snapshot at a destination storage system, is received at the destination storage system. The modify request (a "partial block write" request) is received at the destination storage system from a client while the replication of the snapshot is still ongoing (e.g., less than all blocks of data of the snapshot have been transferred from the source storage system to the destination storage system). The modify request identifies one or more blocks of data using block identities (e.g., a combination of the identity of the file containing the block and the numeric byte offset of the location of the block in the file).

At 1104, it is determined whether data associated with the request is located in the clone. The requested data is first looked for in the clone (e.g., one or more indices of the clone). In the event that the data associated with the request is located in the clone, control is transferred to 1106, at which the data is modified in the clone based on the request. Otherwise, in the event that the data associated with the request is not located in the clone, control is transferred to 1108.

At 1108, it is determined whether the data associated with the request is available in the snapshot. If the requested data is not found in the clone, then the information previously received at the destination storage system from the source storage system that indicates in which blocks of the snapshot data is present is checked to determine whether data is even present (available) in the one or more blocks of the snapshot that are identified in the modify request. In the event that the data associated with the request is available in the snapshot, control is transferred to 1112. If data is present (available) in the one or more blocks of the snapshot that are identified in the modify request, then the process continues. Otherwise, in the event that the data associated with the request is not available in the snapshot, then the partial block of data supplied by the client can be directly written to the clone at 1110. At 1110, a partial block is written to the clone. For example, this comprises the partial block of data that the client supplied, combined with "padding" (e.g., consisting of 0 bytes) sufficient to form a full size block. This full size block is written to the clone.

At 1112, it is determined whether the data associated with the request is located in the data of the snapshot that has been received at the destination storage system so far. The requested data is checked in the snapshot index (as previously described) covering the portion of the snapshot that has been received at the destination storage system so far in the replication process. In the event that the data associated with the request is located in the data of the snapshot that has been received at the destination storage system so far, control is transferred to 1120. Otherwise, in the event that the data associated with the request is not located in the data of the snapshot that has been received at the destination storage system so far, control is transferred to 1114.

At 1114, a control message is sent to a source storage system to prioritize transfer of the data associated with the request. Given that the requested data is not among the portion of the snapshot that has been received at the destination storage system so far in the replication process, a control message is sent to expedite the transfer of the requested data to the destination storage system. In response to the control message, the source storage system will send the requested data to the destination storage system sooner than it would have otherwise based on a predetermined sequence of sending the blocks of data of the snapshot. In some embodiments, an acknowledgment that the modify request has been completed is sent to the client at this step (e.g., prior to actually completing the modify request).

At 1116, the data associated with the request is received at the destination storage system from the source storage system. The data associated with the one or more blocks of the snapshot that are identified in the modify request is received at the destination storage system.

At 1118, the data associated with the request is written to the snapshot at the destination storage system. The received data associated with the one or more blocks of the snapshot is written to those blocks at the snapshot at the destination storage system.

At 1120, the data is modified based on the modify request. A portion of each of the blocks of the snapshot that are identified in the modify request is modified based on the modification indicated in the request.

At 1122, the modified data associated with the request is written to the clone. The block(s) that have been partially modified based on the request are written to the clone. In some embodiments, an acknowledgement that the modify request has been completed is sent to the client at this step (e.g., after actually completing the modify request).

Figure 12:
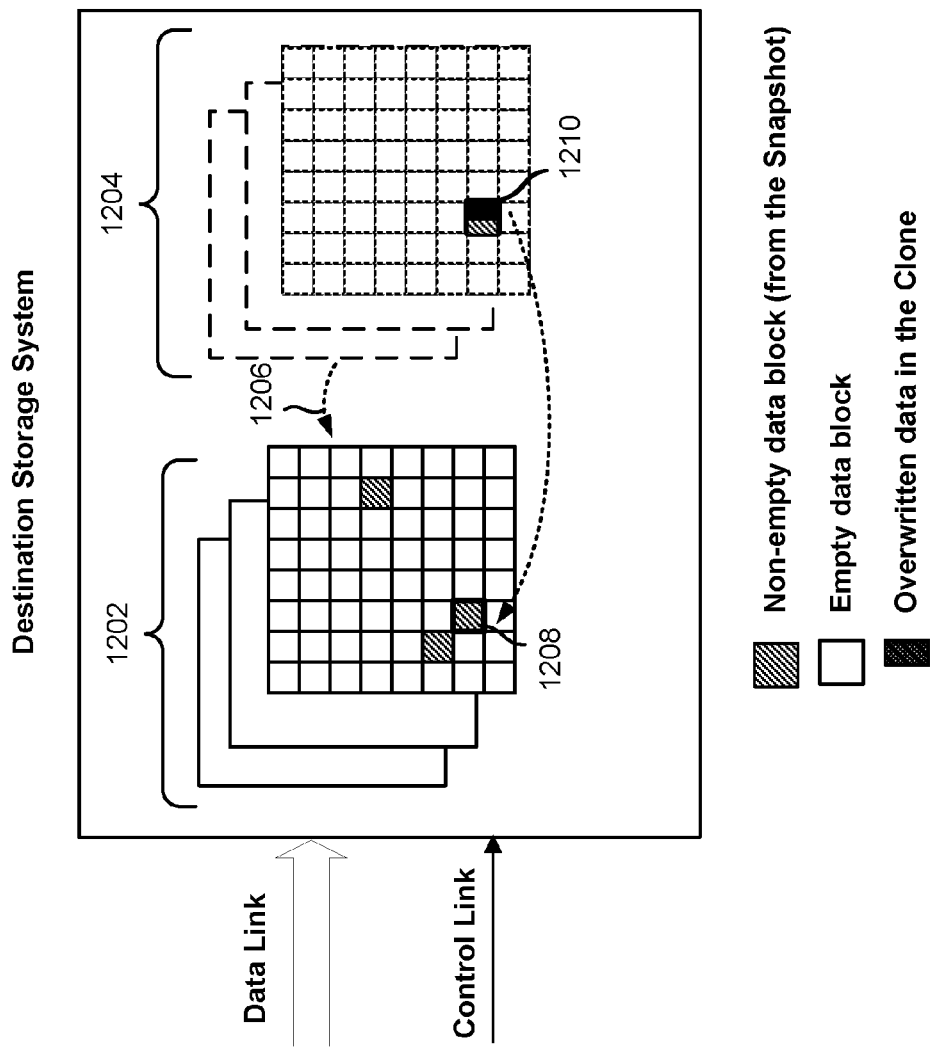
FIG. 12 is a diagram showing an example of writing a partial block of data from a snapshot in a clone of the snapshot at a destination storage system during the ongoing replication of the snapshot at the destination storage system in accordance with some embodiments.

FIG. 12 is a diagram showing an example of writing a partial block of data from a snapshot in a clone of the snapshot at a destination storage system during the ongoing replication of the snapshot at the destination storage system in accordance with some embodiments. For example, process 1100 of FIG. 11 can be used to perform the modify data operation in the example of FIG. 12. In this ongoing replication process, two blocks of data of snapshot 1202 have been received at the destination storage system so far, while other blocks of snapshot 1202 are still being transferred from the source storage system based on a predetermined sequence. Clone 1204 has been generated from snapshot 1202 and pointer 1206 has been established between clone 1204 and snapshot 1202. A modify request to block 1210 of clone 1204 is received at the destination storage system from a client (that is not shown in the diagram). Block 1210 is checked at clone 1204 but no data is found. As such, in some embodiments, the destination storage system next checks information previously received from the source storage system that indicated which blocks of snapshot 1202 have data present. Block 1208 of snapshot 1202 corresponds to the identity of block 1210 of clone 1204. It is then determined that block 1208 of snapshot 1202 does have data present and so the destination storage system checks block 1208 among the data of snapshot 1202 that has been received so far. Since the data of block 1208 of snapshot 1202 has not yet been received at the destination storage system, the destination storage system sends a request (e.g., a control message), over the control link, to the source storage system to request a prioritized transfer of the data of block 1208 of snapshot 1202 to the destination storage system. Once the data of block 1208 of snapshot 1202 is received at the destination storage system, the data of block 1208 is written to snapshot 1202. Then, a portion of the data of block 1208 is modified based on the modify request and then written to clone 1204. The result of the completed partial block write is modified data of block 1210 of clone 1204.

Figure 13:
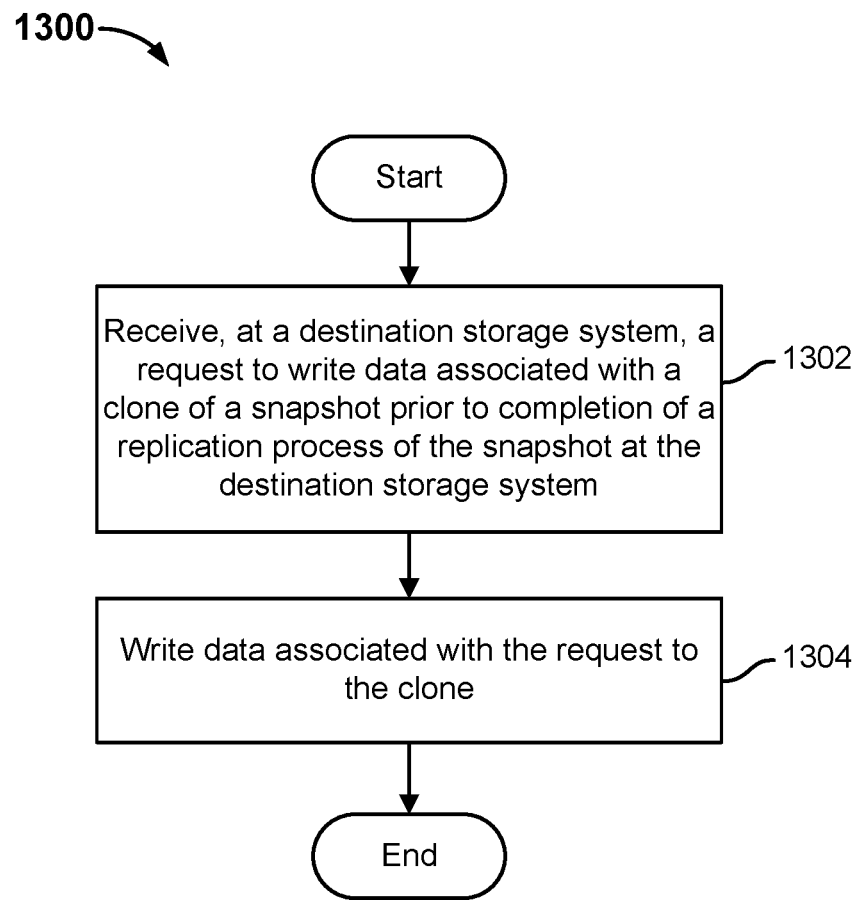
FIG. 13 is a flow diagram showing an example of writing data to a clone generated from a snapshot associated with an ongoing replication at a destination storage system in accordance with some embodiments.

FIG. 13 is a flow diagram showing an example of writing data to a clone generated from a snapshot associated with an ongoing replication at a destination storage system in accordance with some embodiments. In some embodiments, process 1300 is performed wholly or partly by a storage system (e.g., storage system 102 of FIG. 1) and/or other processing system, for example, one configured to execute computer instructions that implement the steps of process 1300.

Process 1300 can be implemented to perform a write operation to one or more full/entire blocks of data of a clone of a snapshot that is in the process of being replicated from a source storage system to a destination storage system. Process 1300 is unlike process 1100 because process 1100 of FIG. 11 involves reading an entire block of data from a snapshot but modifying/writing to less than the entire block.

At 1302, a request to write data associated with a clone of a snapshot prior to completion of a replication process of the snapshot at a destination storage system is received at the destination storage system. The write request comprises new data to be written to one or more blocks that are identified in the clone.

At 1304, data associated with the request is written to the clone. The new data of the request is written to the identified blocks of the clone. As described above, because the clone comprises a new set of indices relative to the snapshot on which they were based, new data written to the clone is not propagated back to the snapshot and just written to the set of indices of the clone. As such, a write to one or more full/entire blocks of data of a clone of a snapshot that is in the process of being replicated from a source storage system to a destination storage system does not interrupt nor alter the replication process. In some embodiments, once the data is written to the clone, an acknowledgement that the write request has been completed is sent to the client.

Figure 14:
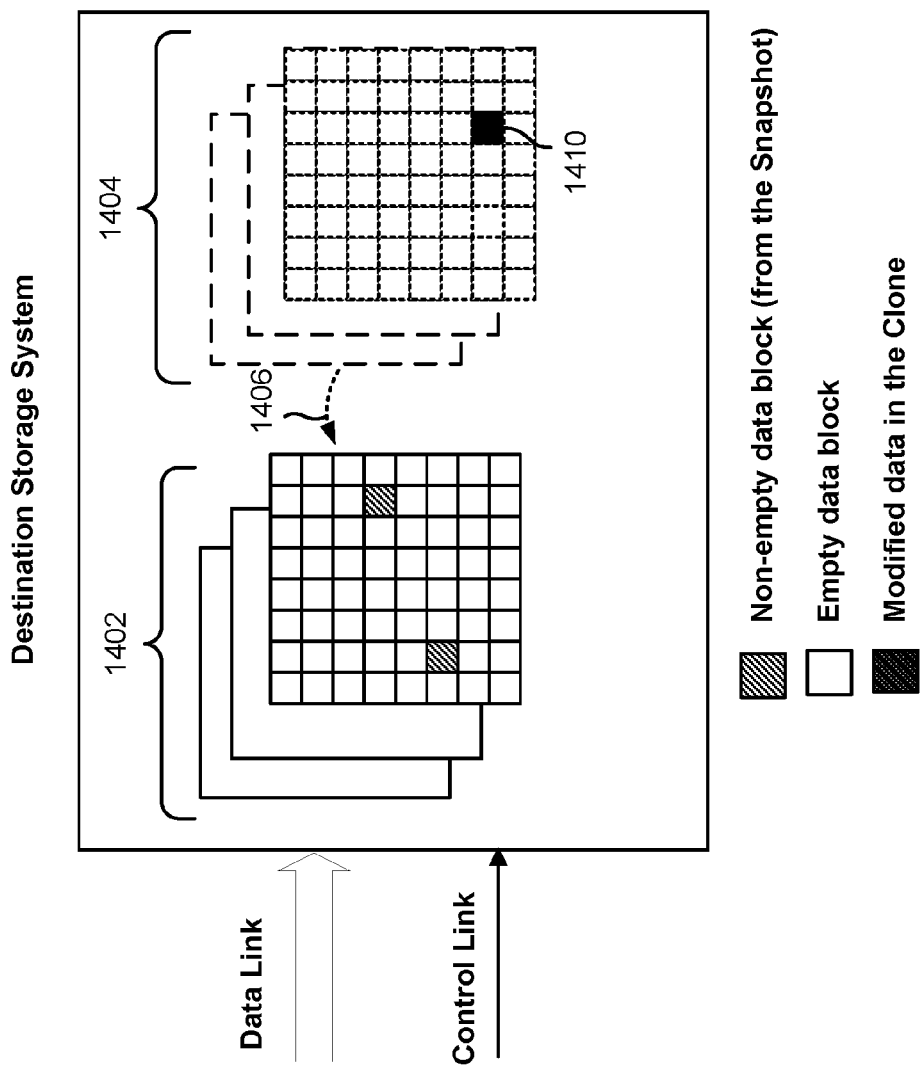
FIG. 14 is a diagram showing an example of writing data to a clone of a snapshot at a destination storage system during the ongoing replication of the snapshot at the destination storage system in accordance with some embodiments.

FIG. 14 is a diagram showing an example of writing data to a clone of a snapshot at a destination storage system during the ongoing replication of the snapshot at the destination storage system in accordance with some embodiments. For example, process 1300 of FIG. 13 can be used to perform the write data operation in the example of FIG. 14. In this ongoing replication process, two blocks of data of snapshot 1402 have been received at the destination storage system so far, while other blocks of snapshot 1402 are still being transferred from the source storage system based on a predetermined sequence. Clone 1404 has been generated from snapshot 1402 and pointer 1406 has been established between clone 1404 and snapshot 1402. A write request to block 1410 of clone 1404 is received at the destination storage system from a client (that is not shown in the diagram). The data associated with the write request is then written to block 1410 of clone 1404 without interruption to the replication process of snapshot 1402 or performing a similar operation to snapshot 1402.

While many storage systems have replication or data migration capabilities, the order in which data blocks are replicated is typically determined on a relatively static basis by the replication sender, e.g., in snapshots (according to a predetermined ordering that was made at the time of snapshot creation) or other structures reflecting the order in which the data was written, or the logical placement (byte offset) of the data blocks based on their placement in the internal file or other mechanisms used within the data storage system. In various embodiments as described herein, the replication sender (e.g., the source storage system) is able to send blocks of data of a snapshot on demand (e.g., in response to a control message from the destination storage system), in an ordering determined by the destination storage system, with no restrictions imposed by any physical or logical characteristic of the block as they exist on the source storage system.

Without the clone and virtual snapshot capabilities described herein, the destination storage system must implement a more complex scheme in which incoming data from the source storage system as well as block writes from clients must share access to the same underlying file(s), or more generally, organized storage for data blocks. On the destination storage system, mixing writes from clients as well as writes (incoming data) from the source storage system in the same internal file(s) creates a more complex system which is more prone to implementation errors that could cause data corruption. In various embodiments as described herein, incoming replication writes from a source storage system and client-generated writes are strictly separated at the destination storage system.

Another way to provide access to the snapshot at the destination storage system would be first to replicate the snapshot in its entirety at the destination storage system and then create a clone from the snapshot at the destination storage system. This is what typical implementations do. However, such a technique requires a potentially substantial time delay before the data can be accessed on the destination storage system. Various embodiments as described herein avoid this delay.

Preserving the integrity and identity of a snapshot on the destination storage system with respect to updates to its clone permits multiple independent storage system clones to be created based on the replicated snapshot. This saves storage system capacity compared to the alternative of creating copies of the snapshot content for each clone, because blocks in common in the snapshot are not overwritten in each of its clones. Thus, generating any number of clones from a snapshot requires only a single physical copy of the snapshot.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving data from a source storage system associated with an ongoing replication process of a snapshot, wherein the received data includes information indicating which one or more blocks include data and which one or more blocks do not include data in the snapshot; and
    prior to the completion of the replication process of the snapshot, generating a set of metadata associated with a clone of the snapshot, wherein at least a portion of data comprising the snapshot that has been received at the destination storage system can be read using the clone while the replication process of the snapshot is ongoing, wherein:
        the at least portion of data comprising the snapshot that has been received at the destination storage system comprises a first data structure;
        the set of metadata associated with the clone comprises a second data structure that is different from the first data structure associated with the snapshot at the destination storage system; and
        the second data structure associated with the clone references the first data structure associated with the snapshot;
    receiving a request associated with a block associated with the snapshot; and
    prior to determining whether data associated with the block has been received from the source storage system, determining, in response to receiving the request, whether the block includes data based at least in part on the information indicating which one or more blocks include data and which one or more blocks do not include data in the snapshot.

2. The method of claim 1, wherein the request associated with the block associated with the snapshot is received prior to the completion of the replication process of the snapshot.

3. The method of claim 2, wherein the request includes a block identity associated with the block.

4. The method of claim 2, wherein the request associated with the block associated with the snapshot comprises a first request and further comprising:
    determining that a data value associated with the block associated with the first request has not yet been received at the destination storage system from the source storage system; and
    sending to the source storage system a second request associated with prioritizing transfer to the destination storage system of the data value.

5. The method of claim 4, further comprising determining that the block includes data based at least in part on the information indicating which one or more blocks include data and which one or more blocks do not include data in the snapshot.

6. The method of claim 4, further comprising determining that the data value associated with the block associated with the first request is not found in the set of metadata associated with the clone prior determining whether the block includes data based at least in part on the information indicating which one or more blocks include data and which one or more blocks do not include data in the snapshot.

7. The method of claim 4, wherein the data associated with the ongoing replication process of the snapshot is received based on a predetermined sequence from the source storage system and wherein the second request associated with prioritizing transfer to the destination storage system of the data value requests the source storage system to transfer the data value earlier than the data value would be transferred based on the predetermined sequence.

8. A computer program product, the computer program product being embodied in a non-transitory computer readable storage medium and comprising computer instructions for:
    receiving data from a source storage system associated with an ongoing replication process of a snapshot, wherein the received data includes information indicating which one or more blocks include data and which one or more blocks do not include data in the snapshot; and prior to the completion of the replication process of the snapshot, generating a set of metadata associated with a clone of the snapshot, wherein at least a portion of data comprising the snapshot that has been received at the destination storage system can be read using the clone while the replication process of the snapshot is ongoing, wherein:
- the at least portion of data comprising the snapshot that has been received at the destination storage system comprises a first data structure;
- the set of metadata associated with the clone comprises a second data structure that is different from the first data structure associated with the snapshot at the destination storage system; and
- the second data structure associated with the clone references the first data structure associated with the snapshot;

receiving a request associated with a block associated with the snapshot; and prior to determining whether data associated with the block has been received from the source storage system, determining, in response to receiving the request, whether the block includes data based at least in part on the information indicating which one or more blocks include data and which one or more blocks do not include data in the snapshot.

9. A destination storage system, comprising:
a processor configured to:
- receive data from a source storage system associated with an ongoing replication process of a snapshot, wherein the received data includes information indicating which one or more blocks include data and which one or more blocks do not include data in the snapshot;
- prior to the completion of the replication process of the snapshot, generate a set of metadata associated with a clone of the snapshot, wherein at least a portion of data comprising the snapshot that has been received at the destination storage system can be read using the clone while the replication process of the snapshot is ongoing, wherein:
    - the at least portion of data comprising the snapshot that has been received at the destination storage system comprises a first data structure;
    - the set of metadata associated with the clone comprises a second data structure that is different from the first data structure associated with the snapshot at the destination storage system; and
    - the second data structure associated with the clone references the first data structure associated with the snapshot;
- receive a request associated with a block associated with the snapshot; and
- prior to determining whether data associated with the block has been received from the source storage system, determine, in response to receiving the request, whether the block includes data based at least in part on the information indicating which one or more blocks include data and which one or more blocks do not include data in the snapshot; and a storage device configured to store the set of metadata associated with the clone of the snapshot.

10. The destination storage system of claim 9, wherein the data received from the source storage system associated with the ongoing replication process of the snapshot comprises one or more of the following: a count of files included in the snapshot, names of the files included in the snapshot, and sizes of the files included in the snapshot.

11. The destination storage system of claim 9, wherein the request comprises a first request associated with the block associated with the snapshot and wherein the processor is further configured to:
- receive a second request to write new data to the clone; and
- write the new data to the clone, including by updating the set of metadata associated with the clone.

12. The destination storage system of claim 9, wherein the snapshot is associated with virtual machine data.

13. The destination storage system of claim 9, wherein the request associated with the block associated with the snapshot is received prior to the completion of the replication process of the snapshot.

14. The destination storage system of claim 13, wherein the request includes a block identity associated with the block.

15. The destination storage system of claim 13, wherein the request associated with the block associated with the snapshot comprises a first request and wherein the processor is further configured to:
- determine that a data value associated with the block associated with the first request has not yet been received at the destination storage system from the source storage system; and
- send to the source storage system a second request associated with prioritizing transfer to the destination storage system of the data value.

16. The destination storage system of claim 15, wherein the processor is further configured to determine that the data value associated with the block associated with the first request is not found in the set of metadata associated with the clone prior to determining whether the block includes data based at least in part on the information indicating which one or more blocks include data and which one or more blocks do not include data in the snapshot.

17. The destination storage system of claim 15, wherein the data associated with the ongoing replication process of the snapshot is received based on a predetermined sequence from the source storage system and wherein the second request associated with prioritizing transfer to the destination storage system of the data value requests the source storage system to transfer the data value earlier than the data value would be transferred based on the predetermined sequence.

18. The destination storage system of claim 15, wherein the processor is further configured to:
- receive the data value from the source storage system;
- modify the data value; and
- write the modified data value to the clone, including by updating the set of metadata associated with the clone.

19. The destination storage system of claim 13, wherein the processor is further configured to determine that the block includes data based at least in part on the information indicating which one or more blocks include data and which one or more blocks do not include data in the snapshot.

* * * * *